US 8,405,633 B2

(12) United States Patent
Geaghan

(10) Patent No.: US 8,405,633 B2
(45) Date of Patent: *Mar. 26, 2013

(54) TOUCH SENSITIVE DEVICES WITH COMPOSITE ELECTRODES

(75) Inventor: Bernard O. Geaghan, Salem, NH (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/591,327

(22) Filed: Aug. 22, 2012

(65) Prior Publication Data
US 2012/0313893 A1 Dec. 13, 2012

Related U.S. Application Data

(63) Continuation of application No. 12/511,487, filed on Jul. 29, 2009, now Pat. No. 8,279,187.

(60) Provisional application No. 61/085,693, filed on Aug. 1, 2008.

(51) Int. Cl.
G06F 3/044 (2006.01)

(52) U.S. Cl. ...................... 345/173; 345/156; 178/18.01; 178/18.06; 463/37; 463/38

(58) Field of Classification Search .......... 345/156–158, 345/173; 178/18.01–18.09; 463/37–38
See application file for complete search history.

(56) References Cited

U.S. PATENT DOCUMENTS

| 4,745,240 | A | 5/1988 | Furukawa |
| 5,512,131 | A | 4/1996 | Kumar et al. |
| 6,137,427 | A * | 10/2000 | Binstead .................. 341/33 |
| 6,222,528 | B1 | 4/2001 | Gerpheide |
| 6,452,514 | B1 | 9/2002 | Philipp |
| 7,129,935 | B2 | 10/2006 | Mackey |
| 7,160,583 | B2 | 1/2007 | Frey et al. |
| 2002/0000977 | A1 | 1/2002 | Vranish |
| 2005/0083307 | A1 | 4/2005 | Aufderheide et al. |
| 2006/0001800 | A1 | 1/2006 | Sanelle et al. |
| 2006/0012575 | A1 | 1/2006 | Knapp et al. |
| 2006/0097991 | A1 | 5/2006 | Hotelling et al. |
| 2006/0274055 | A1 | 12/2006 | Reynolds et al. |
| 2007/0030254 | A1 | 2/2007 | Robrecht et al. |
| 2007/0128905 | A1 | 6/2007 | Speakman |
| 2007/0236618 | A1 | 10/2007 | Maag et al. |

(Continued)

FOREIGN PATENT DOCUMENTS

| EP | 0 911 906 A2 | 4/1999 |
| JP | 2003-256136 | 9/2003 |
| WO | WO 2007/115032 A2 | 10/2007 |

OTHER PUBLICATIONS

U.S. Appl. No. 61/182,366, filed May 29, 2009, Titled: "High Speed Multi-Touch Device and Controller Therefor".
U.S. Appl. No. 12/393,194, filed Feb. 26, 2009, Titled: "Touch Screen Sensor Having Varying Sheet Resistance".
U.S. Appl. No. 61/076,731, filed Jun. 30, 2008, Titled: "Method of Forming A Microstructure".

(Continued)

*Primary Examiner* — Lun-Yi Lao
*Assistant Examiner* — Saiful A Siddiqui
(74) *Attorney, Agent, or Firm* — Gregg H. Rosenblatt; Steven A. Bern

(57) ABSTRACT

A matrix touch panel having upper and lower electrodes, the upper electrodes being composite electrodes made of a plurality of spaced micro-wires, and allowing, for example, an electric field from lower electrodes to pass between the micro-wires and thereby capacitively couple with a touching object, such as a finger.

23 Claims, 12 Drawing Sheets

U.S. PATENT DOCUMENTS

| | | |
|---|---|---|
| 2008/0143683 A1 | 6/2008 | Hotelling |
| 2008/0158172 A1 | 7/2008 | Hotelling et al. |
| 2008/0158183 A1 | 7/2008 | Hotelling et al. |
| 2008/0252608 A1 | 10/2008 | Geaghan |
| 2009/0165296 A1 | 7/2009 | Carmi |
| 2009/0218310 A1 | 9/2009 | Zu et al. |
| 2009/0219257 A1 | 9/2009 | Frey et al. |
| 2009/0219258 A1 | 9/2009 | Geaghan et al. |
| 2011/0199333 A1* | 8/2011 | Philipp et al. ............ 345/174 |

OTHER PUBLICATIONS

U.S. Appl. No. 61/076,736, filed Jun. 30, 2008, Titled: "Method of Forming a Patterned Substrate".

International Search Report, PCT/US2009/052070, International Filing Date Jul. 29, 2009, Form PCT/ISA/210, 3 pages.

Supplementary European Search Report for EP 09803533, mailed Nov. 26, 2012, 2 pp.

* cited by examiner

TOUCH SENSITIVE DEVICES WITH COMPOSITE ELECTRODES

CROSS REFERENCE TO RELATED APPLICATION

This application is a continuation of U.S. application Ser. No. 12/511,487, filed Jul. 29, 2009 now U.S. Pat. No. 8,279,187, now allowed, the disclosure of which is incorporated by reference in its entirety, which claims the benefit, under 35 U.S.C. §119(e), of U.S. Provisional Patent Application Ser. No. 61/085,693 filed on Aug. 1, 2008, and entitled "Electric Field Pervious Electrodes" the disclosure of which is incorporated by reference in its entirety.

FIELD OF INVENTION

This invention relates generally to touch sensitive devices, particularly those that rely on capacitive coupling between a user's finger or other touch implement and the touch device to identify an occurrence or location of a touch.

BACKGROUND

Touch sensitive devices allow a user to conveniently interface with electronic systems and displays by reducing or eliminating the need for mechanical buttons, keypads, keyboards, and pointing devices. For example, a user can carry out a complicated sequence of instructions by simply touching an on-display touch screen at a location identified by an icon.

There are several types of technologies for implementing a touch sensitive device including, for example, resistive, infrared, capacitive, surface acoustic wave, electromagnetic, near field imaging, etc. Capacitive touch sensing devices have been found to work well in a number of applications. In many touch sensitive devices, the input is sensed when a conductive object in the sensor is capacitively coupled to a conductive touch implement such as a user's finger. Generally, whenever two electrically conductive members come into proximity with one another without actually touching, a capacitance is formed between them. In the case of a capacitive touch sensitive device, as an object such as a finger approaches the touch sensing surface, a tiny capacitance forms between the object and the sensing points in close proximity to the object. By detecting changes in capacitance at each of the sensing points and noting the position of the sensing points, the sensing circuit can recognize multiple objects and determine the characteristics of the object as it is moved across the touch surface.

There are two known techniques used to capacitively measure touch. The first is to measure capacitance-to-ground, whereby a signal is applied to an electrode. A touch in proximity to the electrode causes signal current to flow from the electrode, through an object such as a finger, to electrical ground.

The second technique used to capacitively measure touch is through mutual capacitance. Mutual capacitance touch screens apply a signal to a driven electrode, which is capacitively coupled to a receiver electrode by an electric field. Signal coupling between the two electrodes is reduced by an object in proximity, which reduces the capacitive coupling.

Capacitive touch sensing devices often include two arrays of long, narrow electrodes in the form of a matrix. The arrays can be on two parallel planes and separated by an inter-electrode dielectric. Electrical parameters influenced by sensor construction, such as electrode resistance, inter-electrode (mutual) capacitance, and electrode capacitance to ground must be balanced with performance considerations. For example, high levels of parasitic mutual capacitance among electrodes may interfere with the measurement of small changes to mutual capacitance that occur due to a touch. While a reduction in parasitic mutual capacitance may be achieved by increasing inter-electrode dielectric thickness, this increases the thickness and weight of the touch sensor, and also decreases the capacitance-changing effect of a touch.

There are numerous other performance and construction considerations present when designing a touch sensor. For example, it can be desirable to shield touch signals from electromagnetic interference emitted from nearby electrical components. Capacitive coupling between a touching implement or finger and the lower electrodes can be equalized relative to the top electrodes. There also exists a desire for greater flexibility in the design of electrically conductive elements and a method for an improved manufacturing process for touch systems with customized sensors and unique electrode configurations.

BRIEF SUMMARY

The present application discloses, inter alia, touch sensitive devices capable, with appropriate electronics, of detecting either a single touch or multiple touches applied to different portions of a touch sensitive device at the same or at overlapping times. Touch sensitive devices consistent with the present disclosure include a first set of composite electrodes that are pervious to an electric field generated by a signal from a second set of electrodes such that the electric field permeates through the electrodes to capacitively couple with a touching object (e.g., a finger). The first and second sets of electrodes are on different planes, and may be arranged to form a matrix-type touch sensor. Such devices measure capacitive coupling between the two sets of electrodes or between one set of electrodes and ground to determine the occurrence and location of a touch event.

In one embodiment, a multi-layer touch panel is described, the touch panel comprising a first layer comprising a transparent touch surface; an upper electrode layer comprising a plurality of composite electrodes comprised of a plurality of micro-wire conductors; a lower electrode layer comprising a plurality of electrodes, the upper electrodes and lower electrodes defining an electrode matrix having nodes where the upper and lower electrodes intersect, and wherein the upper electrode layer is disposed between the first layer and the lower electrode layer; and, a dielectric layer disposed between the upper electrode layer and the lower electrode layer. The micro-wires can have varying widths, from 1 to 100 microns, and be made of metals or metal alloys.

In another embodiment, a method for identifying locations of touches or near-touches on a touch sensitive apparatus is described, the method comprising sensing, with an electronic controller, a value indicative of the change of mutual capacitance between an overlapping upper electrode and a lower electrode disposed in a matrix-type touch sensor, the change in mutual capacitance induced by the presence of an object proximate to the touch sensor, wherein the upper electrode is a composite electrode comprised of a plurality of micro-wire conductors.

In some embodiments, the composite electrodes described herein may allow for greater mutual capacitance changes between a touch and non-touch event, thus meaning, for example, greater sensitivity to touch and less susceptibility to noise and parasitic capacitance.

BRIEF DESCRIPTION OF DRAWINGS

The present disclosure may be more completely understood and appreciated in consideration of the following detailed description of various embodiments in connection with the accompanying drawings, in which:

FIG. 7b shows a cross sectional view of an exemplary matrix sensor with an alternative construction compared with that shown in FIG. 7a;

In the following description of the illustrated embodiments, reference is made to the accompanying drawings, in which is shown by way of illustration, various embodiments in which the invention may be practiced. It is to be understood that the embodiments may be utilized and structural changes may be made without departing from the scope of the present invention. Drawings and graphs are for illustration of the disclosure and are not to scale, and in some drawings, dimensions are exaggerated for purposes of illustration.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In the following description, the following definitions clarify terms used within this disclosure:

Ground (Gnd) refers to a common electrical reference point which may be at the voltage of earth ground, or may be a local common voltage.

Mutual capacitance (Cm) is the capacitance between two electrodes in a touch sensor.

Capacitance to ground is the capacitance between a sensor electrode and ground.

Parasitic capacitance is the level of capacitance without the presence of a touch.

A touch sensor includes one or more electrodes configured to make capacitive contact with a conductive object for the purpose of detection and/or location of the object.

Printed circuit board (PCB) refers to a circuit patterned onto a substrate. As used herein, PCB may refer to a rigid PCB made of fiberglass reinforced plastic, or a flexible PCB, commonly referred to as flexprint, or any other type of PCB known in the art.

PMMA refers to poly(methyl methacrylate), a thermoplastic and transparent plastic that is a synthetic polymer of methyl methacrylate. PMMA is also commonly referred to as acrylic glass.

Figure 1:
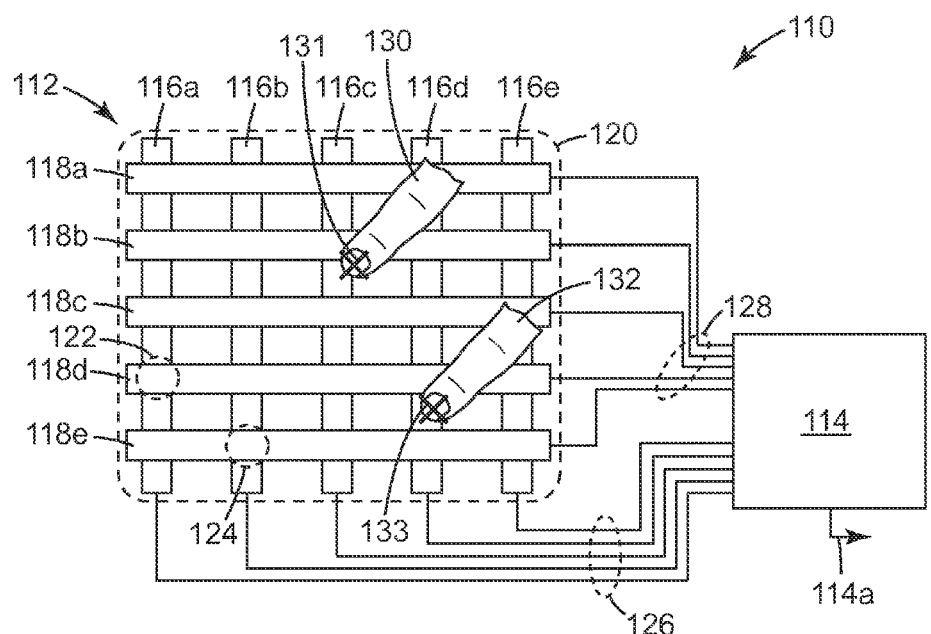
FIG. 1 is a schematic view of a touch device.

FIG. 1 shows exemplary touch device 110. Device 110 includes touch panel 112 connected to controller 114, which includes electronic circuitry for sensing touches and possibly near touches occurring in proximity to touch panel 112. Touch panel 112 is shown as having a 5×5 matrix of column electrodes 116a-e and row electrodes 118a-e, but other numbers of electrodes, matrix sizes and electrode configurations can also be used. Touch panel 112 can be substantially transparent so that the user is able to view an object, such as a pixilated display of a computer, hand-held device, mobile phone, or other peripheral device, through the touch panel 112. The boundary 120 represents the viewing area of touch panel 112 and also preferably the viewing area of such a display, if used. In one embodiment, electrodes 116a-e, 118a-e are spatially distributed, from a plan view perspective, over the viewing area 120.

For illustrative purposes, the electrodes in FIG. 1 are shown to be wide and obtrusive, but in practice they may be relatively narrow and inconspicuous to a user. Each electrode can be designed to have variable widths, e.g., an increased width in the form of a diamond- or other-shaped pad in the vicinity of the nodes of the matrix in order to increase the inter-electrode fringe field and thereby increase the effect of a touch on electrode-to-electrode capacitive coupling. In an exemplary embodiment of the present disclosure, one or more electrodes can be made of an array of electrodes (or conductors), for example, thin wires or micro-wires, printed conductive traces or networks of conductors, as discussed in further detail below. An electrode made up of a plurality of conductors, as further described herein, is referred to as a composite electrode.

In exemplary embodiments the electrodes may be composed of indium tin oxide (ITO), wires, micro-wires or other suitable electrically conductive materials. Wires or micro-wires forming conductors may be made of, for example, copper, silver, gold.

Column electrodes 116a-e may be in a different plane than the row electrodes 118a-e (e.g., column electrodes 116a-e may be underneath row electrodes 118a-e) such that no physical contact is made between respective column and row. The matrix of electrodes typically lies beneath a cover glass, plastic film, or the like (not shown in FIG. 1), so that the electrodes are protected from direct physical contact with a user's finger or other touch-related implement. An exposed surface of such a cover glass, film, or the like may be referred to as the touch surface of touch panel 112.

The capacitive coupling between a given row and column electrode is primarily a function of the geometry of the electrodes in the region where the electrodes are closest together. Such regions correspond to the "nodes" of the electrode matrix, some of which are labeled in FIG. 1. For example, capacitive coupling between column electrode 116a and row electrode 118d occurs primarily at node 122, and capacitive coupling between column electrode 116b and row electrode 118e occurs primarily at node 124. The 5×5 matrix of FIG. 1 has 25 such nodes, any one of which can be addressed by controller 114 via appropriate selection of one of the control lines 126, which individually couple the respective column electrodes 116a-e to the controller, and appropriate selection of one of the control lines 128, which individually couple the respective row electrodes 118a-e to the controller.

When finger 130 of a user or other touch implement comes into contact or near-contact with the touch surface of the device 110, as shown at touch location 131, the finger capacitively couples to the electrode matrix. Finger 130 draws charge from the matrix, particularly from those electrodes lying closest to the touch location, and in doing so it changes the coupling capacitance between the electrodes corresponding to the nearest node(s), as shown in more detail in FIGS. 2 and 3. For example, the touch at touch location 131 lies nearest the node corresponding to electrodes 116c and 118b. This change in coupling capacitance can be detected by controller 114 and interpreted as a touch at or near the 116a/118b node. The controller can be configured to rapidly detect the change in capacitance, if any, of all of the nodes of the matrix, and is capable of analyzing the magnitudes of capacitance changes for neighboring nodes so as to accurately determine a touch location lying between nodes by interpolation. Furthermore, controller 114 can be designed to detect multiple distinct touches applied to different portions of the touch device at the same time, or at overlapping times. Thus, for example, if another finger 132 touches the touch surface of the device 110 at touch location 133 simultaneously with the touch of finger 130, or if the respective touches at least temporally overlap, the controller is capable of detecting the positions 131, 133 of both such touches and providing such locations on a touch output 114a. The number of distinct simultaneous or temporally overlapping touches capable of being detected by controller 114 is not necessarily limited to 2, e.g., it may be 3, 4, or more, depending on the size of the electrode matrix. U.S. Patent Application Ser. No. 61/182, 366, "High Speed Multi-Touch Device and Controller Therefor," describes an exemplary drive scheme that can be used in a touch sensitive device to identify the location of multiple simultaneous touches.

Controller 114 can employ a variety of circuit modules and components that enable it to rapidly determine the coupling capacitance at some or all of the nodes of the electrode matrix. For example, the controller preferably includes at least one signal generator or drive unit. The drive unit delivers a drive signal to one set of electrodes, referred to as drive electrodes. In the embodiment of FIG. 1, column electrodes 116a-e are used as drive electrodes (though it is possible to instead drive row electrodes 118a-e). The drive signal applied by controller 114 to the drive electrodes may be delivered to one drive electrode at a time, e.g., in a scanned sequence from a first to a last drive electrode. As each such electrode is driven, the controller monitors the other set of electrodes, referred to as receive electrodes (row electrodes 118a-e). Controller 114 may include one or more sense units coupled to all of the receive electrodes. For each drive signal that is delivered to each drive electrode, the sense unit(s) generate a response signal for each of the plurality of receive electrodes. Changes in response signals may be indicative of a touch or near-touch event.

Figure 2:
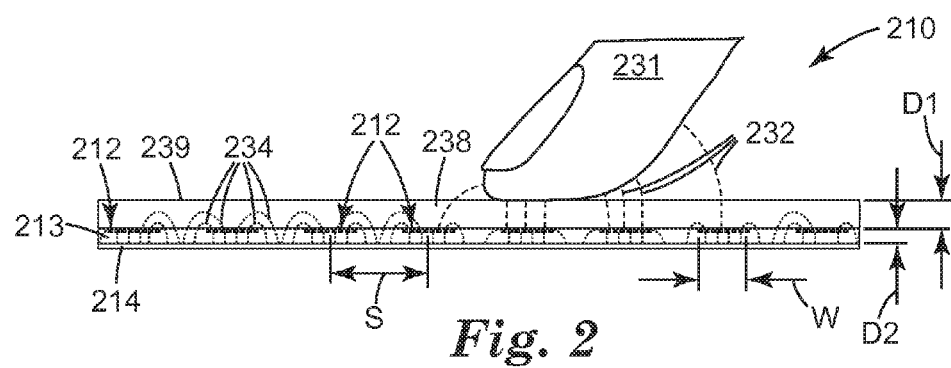
FIG. 2 shows a cross sectional view of an exemplary sensor with a finger touching the touch surface, wherein some of the top electrodes are capacitively coupled to the finger and an electric field is generated between the finger and the top electrodes.

FIG. 2 shows a cross sectional view of a sensor 210 with finger 231 touching touch surface 239. The upper electrode array 212 is separated a distance D1 from the touch surface 239 by a top substrate 238, which can be made of polycarbonate, polyethylene terephthalate (PET), PMMA, glass, silica, or combinations of such (for example, silica coated on glass), PET hard coat material, or any other suitable material. In the case of non-transparent capacitive touch pads, top substrate 238 can be fiberglass reinforced plastic (FRP) as used to make computer boards, or any other suitable material. In the sensor construction shown in FIG. 2, upper electrode array 212 is separated by a distance D2 from lower electrode array 214 by a lower substrate 213. The lower substrate 213 can be made from any of the materials that can be used for top substrate 238, or any other appropriate material. The electrodes of the lower electrode array 214, only one member of which is shown, can be spaced, for example, at a distance from one another that allows three or more electrodes to make measurable capacitive contact with a touching finger 231. For example, lower electrode array 214 can have a center-to-center spacing of 5-6 mm or any other desired spacing. The width of electrodes in lower electrode array 214 is limited primarily by the desire in some embodiments to leave a minimal non-conductive space between them. Electrodes in lower electrode array 214 may be as wide as possible to maximize capacitive coupling with a finger. For example, 90% or more, 95% or more, or 98% or more of the surface area of the lower substrate 213 can be covered by lower electrode array 214.

Upper electrodes are spaced to allow electric field coupling from electrodes in lower electrode array 214 between electrodes in upper electrode array 212, to a touching (or proximate) finger. Width of upper electrodes (W in FIG. 2) can be, for example, 50% or less of center-to-center spacing S. When electrodes in upper electrode array 212 are made of ITO, their minimum width is often limited by electrode resistance. However, electrodes in upper electrode array 212 can be composite electrodes made of thin wires, micro-wires, an interconnected network of micro-conductors, printed micro-conductors or any other configuration and in any material consistent with the present disclosure.

In FIG. 2, long-dashed electric field lines 232 represent the electric field (E-field) coupling between electrodes in upper electrode array 212 and finger 231 when electrodes in upper electrode array 212 are activated with an electrical signal. This coupling takes place through spaces in the composite electrodes that comprise upper electrode array 212. Short-dashed electric field lines 234 represent electric field coupling between electrodes in the upper electrode array 212 and electrodes in lower electrode array 214. Some of short-dashed electric field lines 234 couple from the bottom surface of electrodes in upper electrode array 212 to electrodes in lower electrode array 214. Other electric field short-dashed lines 234 (particularly those not in proximity to finger 231) represent fringe fields, coupling upward from the top surface of electrodes in upper electrode array 212, and curving downward to meet an electrode of the lower electrode array 214. Directly under finger 231, field lines from the top surface of electrodes in array 212 couple to (are attracted to) finger 231, so fewer of them couple to electrodes in lower electrode array 214.

When electrodes of upper electrode array 212 are activated with an electrical signal, finger 231 is connected to ground by relatively low impedance body-to-ground capacitance, (for example, 400 pf) and electrodes of lower electrode array 214 are also connected to ground by parasitic capacitance (for example, 100 pf). Both of these have significantly lower impedance than the capacitance coupling finger 231 to any of the electrodes in array 212 or array 214, which may be in the range of, for example, 1 pf to 5 pf in an exemplary configuration. These capacitance values depend on distances D1, D2, the materials used for substrates, and the distance from upper electrode array 212 and lower electrode array 214 to grounded surfaces not shown in FIG. 2, along with the configurations of the upper electrode array 212 and lower electrode array 214. Similarly, activating an electrode of lower electrode array 214 with an electrical signal generates an electric field from the electrode in lower electrode array 214, through electrodes in upper electrode array 212 to finger 231.

Figure 3:
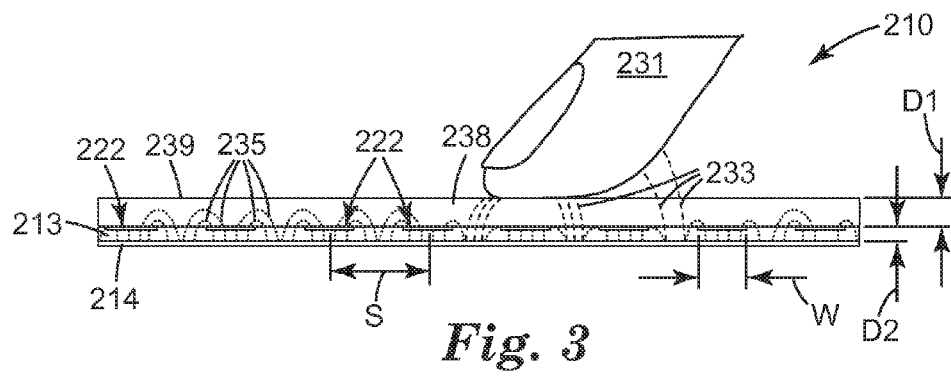
FIG. 3 shows a cross sectional view of an exemplary sensor with a finger touching the touch surface, wherein some of the lower electrodes are capacitively coupled to the finger and an electric field is generated between the finger and the lower electrodes.

Now turning to FIG. 3, long-dashed electric field lines 233 represent the electric field coupling between electrodes in lower electrode array 214 and finger 231 electrodes in upper electrode array 222. FIG. 3 is similar to FIG. 2, except that in FIG. 3, electrodes in upper electrode array 222 are not composite electrodes as they were in FIG. 2; they are instead traditional solid electrodes. Electric field lines 233 couple predominantly from the electrodes of lower array 214, through spaces between the electrodes of upper electrode array 212, to finger 231. Short-dashed electric field lines 235 represent coupling between electrodes of lower electrode array 214 and upper electrode array 222. Some of short-dashed lines 235 couple from the top surface of electrodes in lower electrode array 214 to the bottom surface of electrodes in upper electrode array 222. Other fringe short-dashed electric field lines 235 (particularly those not in proximity to finger 231) couple upward from the top surface of electrodes in lower electrode array 214, and curve downward to meet the top surface of an electrode of upper electrode array 222. Long-dashed electric field lines 233 represent coupling of the top surface of electrodes in array 214 directly to finger 231, so fewer long-dashed electric field lines 233 bend and couple to the top of electrodes in upper electrode array 222.

Note that when electrodes in the upper electrode array 222 are solid, they block the electric field from lower electrodes 214 so E-field 233 that couples to finger 231 is generated primarily in the spaces between upper electrodes 222. However, when upper electrodes are pervious, such as composite electrodes 212 in FIG. 2, they allow the electric field to pass through the spaces between the electrode structures.

Electrodes of upper electrode array (either electrode array 212 or 222) and/or lower electrode array 214 are not necessarily activated simultaneously, as shown, but electric fields of electrodes from upper electrode array and lower electrode array 214 are shown for illustration.

Figure 4:
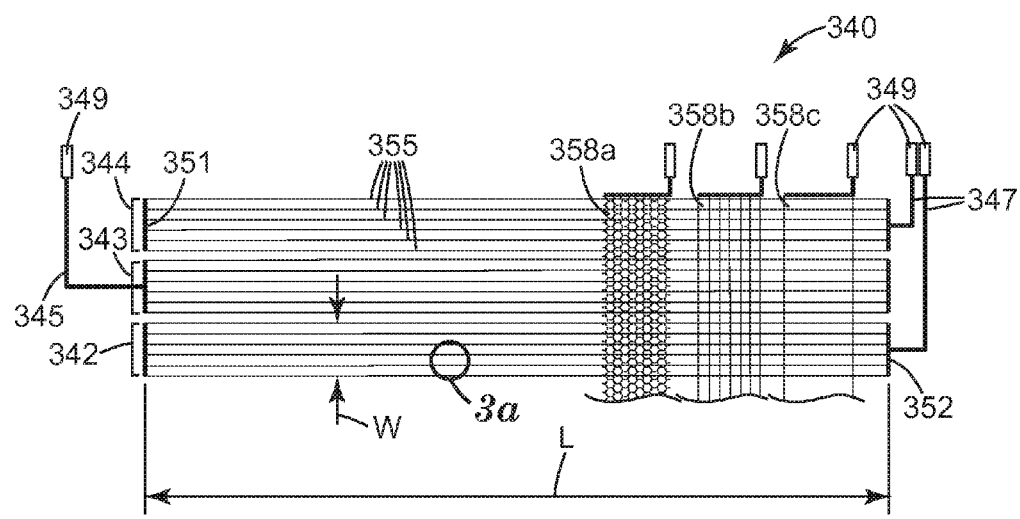
FIG. 4 is a schematic view of a touch sensor including various embodiments of composite electrodes.
Figure 4A:
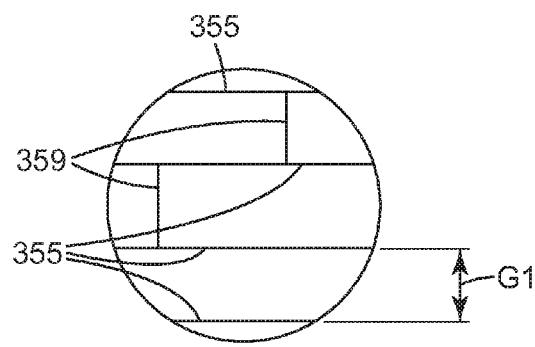
FIG. 4a shows an expanded view of parallel conductors with bridging conductors.

FIG. 4 shows an example touch sensor 340 including three upper composite electrodes 342, 343, and 344, each with width W. Each of composite electrodes 342, 343, and 344 includes parallel conductors 355 (also shown in expanded view V1 in FIG. 4a and sometimes referred to as inter-conductors in the context of a composite electrode). Composite electrodes 342, 343 and 344 are separated by spaces that can be equal in width to the inter-conductor spaces within each composite electrode. Uniform spacing of conductors can result in optical uniformity across the sensor, so conductors are less perceivable to the eye. Conductors 355 are electrically connected to form a composite electrode by, for example, end conductors 351 and 352 at one or both ends, or optionally at intermediate locations (conductor bridges 359 in FIG. 4a).

Conductors 355 can have a cross sectional dimension of less than 10 microns, less than 5 microns, and in some embodiments, less than 3 microns. Conductors 355 with such diameters can yield adequate optical performance such that they are minimally visible on smaller displays with transparent touch surfaces such as those measuring less than 1 meter on the diagonal. Larger conductor cross sections can be used on larger displays, possibly having larger pixels. Conductors can be drawn wires, micro-wires, micro-contacted printed, micro-encapsulated, or can be made by any other appropriate method. Micro-contact printed conductors can be about approximately 2 microns wide by 100-200 nanometers thick, and can be made of silver, gold, or similar metals. Micro-encapsulated conductors 355 can have cross-sectional dimensions approximately 3 microns by 3 microns, and can be made of copper or similar metals. Alternatively, micro-conductors can be made of drawn wires of copper or similar metal, which can have a cross sectional dimension of about 10 microns, for example. Micro-conductors and methods of making them are described later in this application.

Dimensions G1 (FIG. 4a) of spacing between conductors 355 can be between 50 microns and 4 mm. In one embodiment, G1 can be between 0.5 mm to 1 mm. Spaces between conductors can run the full length L of composite electrodes 342 and 343, or spaces may be shortened using connector bridges 359 at regular or random intervals as shown in electrode 342 or as described in U.S. patent application Ser. No.

12/393,194 "Touch Screen Sensor Having Varying Sheet Resistance", incorporated herein by reference. For optimal electrical performance, conductor bridges 359 of upper composite electrodes 342 and 343 are minimized so spacing exists (thus allowing the electric field to rise up through the composite electrode). In many applications, the long dimension of spacings are preferably in the same direction as the long dimension of composite electrodes 342, 343, and 344, though it is also possible to arrange spaces to have their long dimension orthogonal to the long dimension of composite electrodes 342, 343, and 344. These principles apply to electrodes that include networks of conductors patterned as parallel lines or any in other shape, including circular, hexagonal or square conductor networks.

Electrodes 358a, 358b, and 358c are three alternative types of lower electrodes. In the illustrated embodiment of FIG. 4, these are on a separate parallel plane beneath the plane that includes composite electrodes 342, 343, and 344. Conductors of electrode 358a are arranged in an isotropic network of interconnected hexagons, which provide capacitive properties and some shielding properties, but may be somewhat visible on a transparent touch surface, when compared to an electrode of parallel conductors like electrode 358b (a composite electrode). Electrode 358c is made of a film of transparent ITO, with resistivity of about 600 ohms/square or less in an exemplary embodiment. Electrode 358c has generally good optical properties and good shielding properties at frequencies less than 1 MHz. At the intersections of electrode 358b with composite electrodes 342, 343, and 344 the conductors overlap only at intersection points, with dielectric material filling gaps between intersections. This minimizes the mutual capacitance coupling between electrode 358b and composite electrodes 342, 343, and 344. Electrode 358a has more mutual capacitive coupling than 358b, due to a higher density of conductors and the presence of horizontal conductor elements in the conductor pattern of electrode 358a. Electrode 358c has more mutual capacitive coupling than electrodes 358a or 358b.

Electrodes 358a and 358b can also suitable for use in upper (pervious) composite electrodes, provided that the inter-conductor spacing (e.g. G1) is wide relative to substrate thicknesses, so electric fields will permeate from an electrode below. Composite electrodes such as 343, 344, and 358b comprising parallel conductors are also well suited to use in interleaved electrode configurations, as described in U.S. Patent Application Publication No. 2007/0074914 A1 "Interleaved Electrodes for Touch Sensing", incorporated herein by reference.

Impedance (both resistive and capacitive) of composite electrodes 342, 343, 344 and 358b can be anisotropic. In such case, resistivity (ohms/square) is typically lowest in the direction of conductor orientation. Near-field electric fields (particularly within the distance range of dimension G1) generated by composite electrodes 342, 343, 344 and 358b will be anisotropic, so capacitance per square meter (C/M) between two electrodes of this type placed in proximity on parallel planes will depend on the relative angles of electrodes, with parallel electrodes yielding the largest capacitance and orthogonal electrodes having the least mutual capacitance. Unlike the conductive plate electrode 358c, composite electrodes 342, 343, 344, 358a, and 358b are pervious to electric fields to a degree dependent on the spacing of conductors of the network within each electrode.

Conductors in pervious upper composite electrodes 342, 343, 344 may, in one embodiment, be referred to as microwires and be fabricated by micro-contact printing as described in U.S. Pat. No. 5,512,131, "Formation of Microstamped Patterns on Surfaces and Derivative Articles," and U.S. Pat. No. 7,160,583, "Microfabrication Using Patterned Topography and Self-Assembled Monolayers," both of which are incorporated herein by reference. Upper composite electrodes 342, 343, 344 can be micro-contact printed onto a top substrate (not shown), which can be made of glass, PET, or any other appropriate material. Alternatively, composite electrodes 342, 343, 344 can be applied to a lower substrate (not shown) by micro-contact printing. Lower electrodes 358a-c can be applied to a lower substrate (not shown) by micro-contact printing (described above), or micro-encapsulated conductors may be applied, for example, as disclosed in U.S. Patent Application No. 61/076,731 "Method of Forming a Microstructure", incorporated herein by reference, or ITO thin films can be used. Alternatively, copper conductors on flex print or on fiber reinforced plastic (that is, a PCB material) can be used.

E-field coupling can be measured by measuring a signal indicative of the capacitance between each conductor in a composite upper electrode array and each electrode in a lower electrode array, using mutual capacitance measurement methods and circuits known in the art. In the case of a matrix touch sensor like those shown in FIGS. 1-4, mutual capacitance between an upper electrode and a lower electrode at a node can first be measured prior to any touch being applied, and a level of capacitance associated with no-touch can be recorded for each intersection. Capacitance of all nodes is repeatedly measured, and when a touch occurs, the difference in capacitance between the no-touch state and the touch proximity state of one or more intersections is calculated. Touchdown is generally identified as a capacitance change greater than a predetermined threshold value. Pre-touch (hover) may also be identified with a different threshold value.

Making Composite Electrodes

Figure 5A:
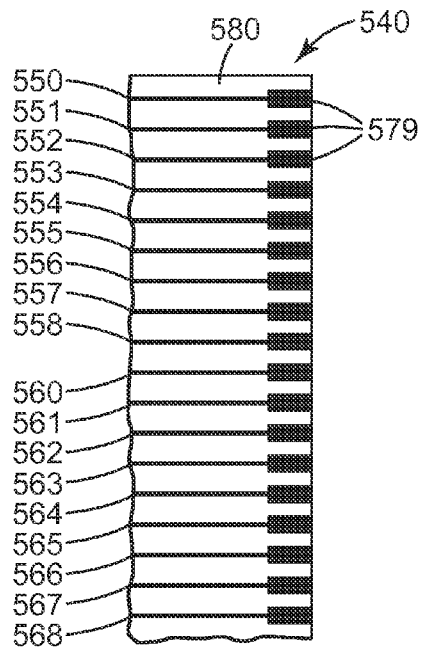
FIG. 5a shows a segment of sensor substrate with parallel conductors on the substrate.
Figure 5B:
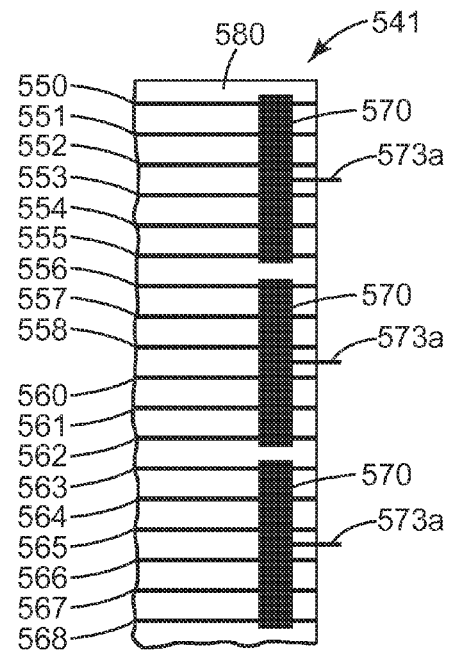
FIG. 5b shows a segment of sensor substrate with end conductors electrically connecting parallel conductors to form composite electrodes.

FIG. 5a shows a segment of sensor component 540 with parallel conductors 550-568 on substrate 580. In one embodiment, each of the conductors 550-568 includes a single conductor, or multiple parallel conductors, or a network of conductors as described with respect to FIG. 4. Conductors 550-568 are electrically isolated from one another. Substrate 580 can include a rigid glass or PMMA sheet, a roll of PET or any other appropriate material. Optional contact pads 579 can be added to each conductor on the substrate 540 using readily available conductive inks in instances, for example, when it is difficult to make electrical contact with the conductors 550-568.

Various methods of making individual conductors on substrates are additionally described in U.S. patent application Ser. No. 12/393,185 ("Touch Screen Sensor"); Ser. No. 12/393,197 ("Touch Screen Sensor With Low Visibility Conductors"); Ser. No. 12/393,194 ("Touch Screen Sensor Having Varying Sheet Resistance"); Ser. No. 12/393,201 ("Methods of Patterning a Conductor on a Substrate"); and 61/076,736 ("Method of Forming a Patterned Substrate"), each of which is incorporated herein by reference. U.S. Pat. No. 6,137,427, "Multiple Input Proximity Detector and Touchpad System," provides more detail on making conductors including thin copper wires, incorporated herein by reference.

In one embodiment, an initial step of a method of making touch sensors consistent with the present disclosure is to first manufacture substrate 580 with parallel conductors 550-568 spaced apart by a fixed distance. Substrate 580 can have dimensions large enough to fit the length and width of the largest touch sensors to be manufactured, or can have any other appropriate dimensions.

Figure 5C:
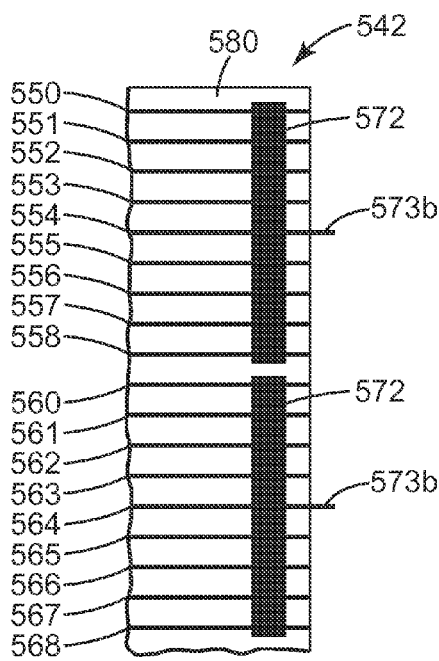
FIG. 5c shows a segment of sensor substrate with end conductors electrically connecting parallel conductors to form composite electrodes.
Figure 5D:
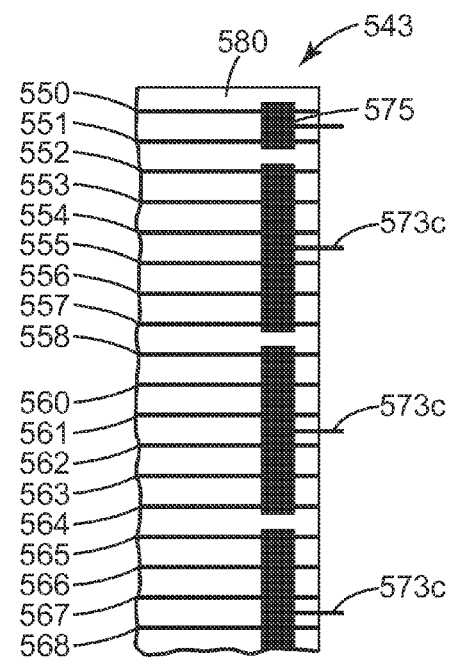
FIG. 5d shows a segment of sensor substrate with end conductors electrically connecting parallel conductors to form composite electrodes.
Figure 5E:
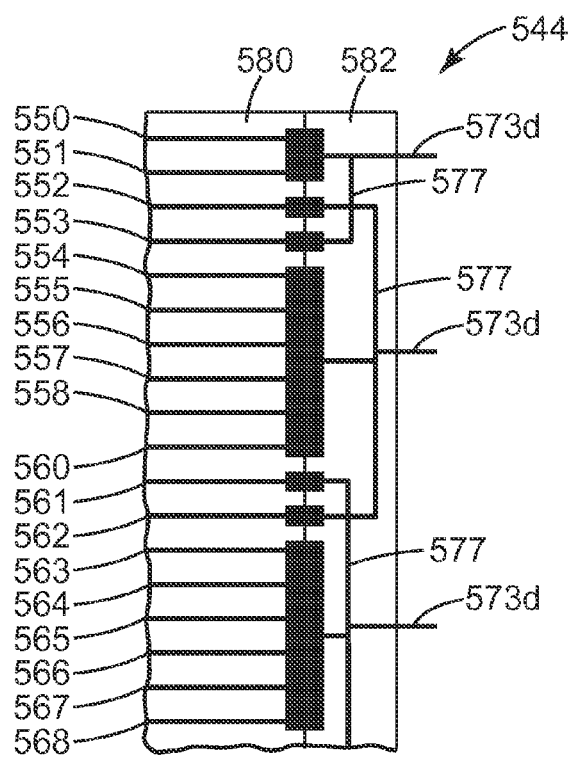
FIG. 5e shows a segment of sensor substrate with end conductors electrically connecting parallel conductors to form composite electrodes, wherein some of the parallel conductors are interleaved.
Figure 5F:
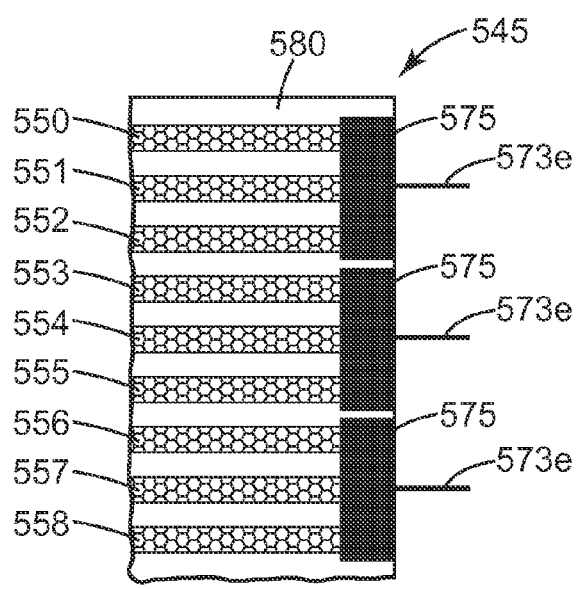
FIG. 5f shows a segment of sensor substrate with end conductors electrically connecting parallel network conductors to form composite electrodes.

After the substrate 580 with conductors 550-568 is manufactured, selected conductors 550-568 can be electrically coupled together to form composite electrodes as shown in FIGS. 5b-5f. Conductors 550-568 can be connected by coating or printing conductive material onto substrate 540 or by any other appropriate method. For example, with respect to configuration of sensor substrate 541 (FIG. 5b), end conductors 570 can be printed onto conductors 550-568 and substrate 580 to form three composite electrodes, each comprised of six conductors. As shown in FIGS. 5c and 5d, other numbers of electrodes 550-568 can be connected by end conductors 572. Any desired numbers of electrodes can be electrically connected by end conductors to form various configurations of pervious composite electrodes. End conductors can then be electrically connected to connectors or directly to electronics (not shown) via interconnects 573a and b. Alternatively, end conductors 570 and 572 can be disposed on a PC board or a flex print circuit, which is laid over conductors 550-568 and electrically connected to conductors 550-568 by conductive ink, for example as described in U.S. Patent Application Publication No. 2007/0030254 A1 "Integration of Touch Sensors with Directly Mounted Electronic Components," incorporated herein by reference. FIG. 5e shows a configuration of sensor component 544 having interleaved electrode patterns. Configuration of sensor substrate 545 in FIG. 5f shows an example of sensor component 545 including substrate 580 with conductors 550-558, wherein each conductor is made of a honeycomb network of wires. Conductors 550-558 are electrically coupled by end conductors 575 to form composite electrodes. Interconnects 573e, electrically coupled to composite electrodes, connect the electrodes to other electrical components.

If a sensor is to have two or more layers of electrodes, both layers can be made from the same substrate 580 or from different substrates. For example, a matrix sensor can be made by laminating an upper layer of electrodes with a bottom layer (as shown in FIG. 4 with respect to lower composite electrodes 342, 343, and 344). Alternatively, one set of electrodes may be made with the process described herein, and another layer of electrodes may be made with another process, or using a different material, such as patterned ITO or any other desired material. Once formed, sensor components (e.g. 541, 542, 543, 544 and 545 shown in FIGS. 5b-5f), can be cut to size, and upper and lower electrode layers can be laminated together. Laminating may precede cutting, or vice versa.

Sensors made according to the present disclosure can be customized to various shapes, sizes and configurations at the time of sensor manufacture. For example, sensor component 540 in FIG. 5a may comprise substrate 580 (for example, PET) with electrodes spaced 1 mm apart or any other appropriate distance. Sensor component 540 can be subsequently configured to make any of sensor components 541, 542, 543, 544, or 545 as shown in FIGS. 5b-5f, or other configurations as desired. Sensor component 541 in FIG. 5b has 5 mm wide electrodes, and sensor component 542 in FIG. 5c has 8 mm wide electrodes. Sensor component 543 has 5 mm wide electrodes, except at the edge where 1 mm wide edge electrode 575 is used to improve position interpolation near the edge of the sensor. Other embodiments of "edge bar" electrodes are described in U.S. Patent Application Publication No. 2008/0252608 A1 "Touch Sensor with Electrode Array," incorporated herein by reference. Sensor component 544 (FIG. 5e) also has edge electrode 575, and 5 mm wide main electrodes, each connected to two 1 mm wide outer electrodes that are interleaved with the outer electrodes of adjacent electrodes. Each of the above mentioned electrode spacings and widths can be increased or decreased in accordance with the present disclosure.

Figure 6:
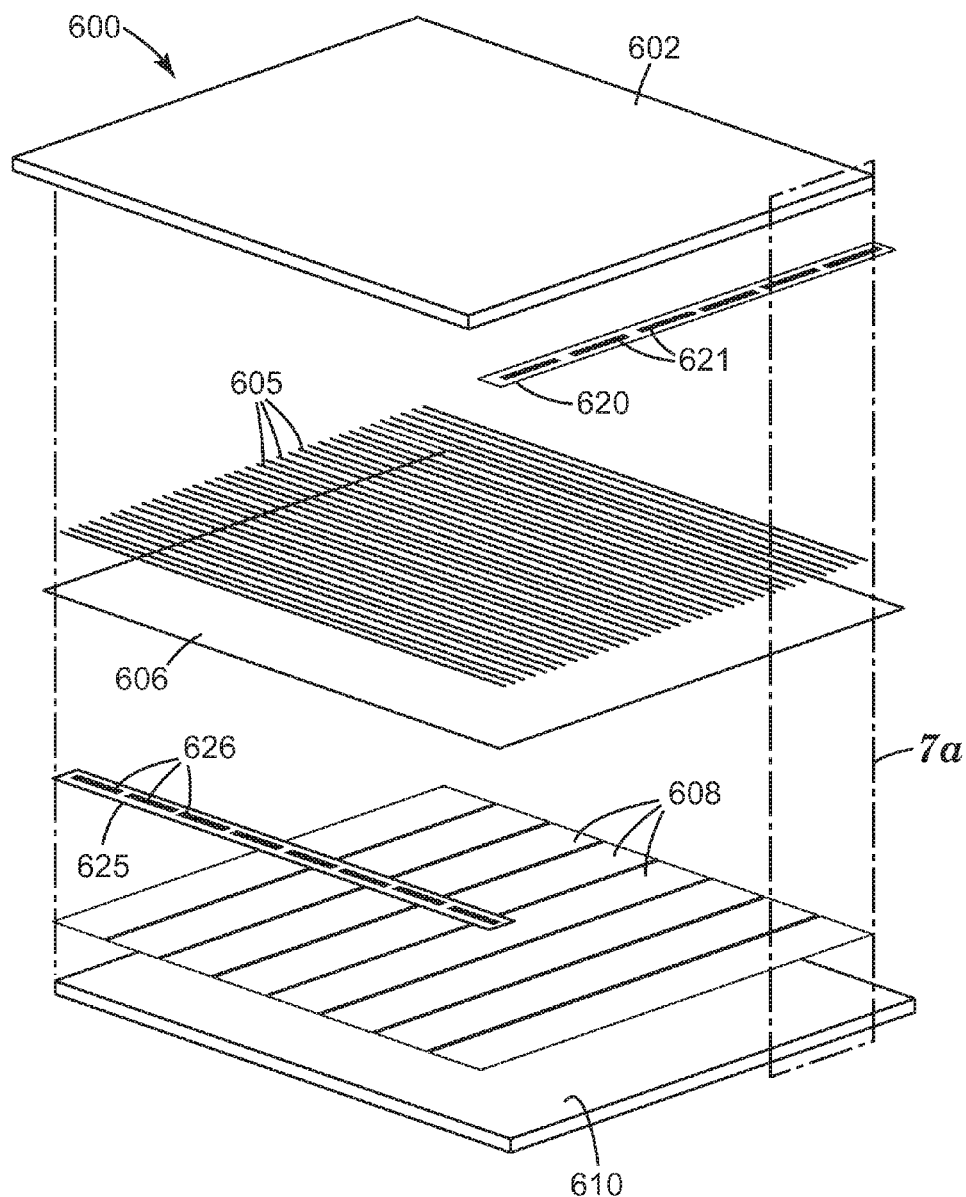
FIG. 6 shows an exploded view of an exemplary matrix sensor with an array of parallel conductors arranged above a second array of ITO electrodes.

FIG. 6 shows an exploded view of an exemplary matrix sensor 600 with a plurality of parallel conductors 605 arranged above a plurality of ITO electrodes 608. While parallel conductors 605 and ITO electrodes 608 are orthogonal to each other in the illustrated embodiment, they can be at any desired angle. In FIG. 6, upper parallel conductors 605 include thirty-six discrete (not electrically coupled) conductors disposed upon substrate 606. Groups of these discrete conductors (six conductors each, in this example) are electrically coupled by end conductors 621 which are part of substrate 620 (a printed circuit board, for example) to form composite conductors. ITO electrodes 608 are coated onto substrate 610 which may be glass, PET, or another suitable material. The electrical connections from ITO electrodes 608 to end conductors 626 on substrate 625 have a 1 to 1 in ratio (as opposed to the groupings of the conductors 605, which have a 6:1 ratio). Electrical connections between end conductors 626 and the ITO electrodes 608, and between end conductors 621 and conductors 605 can be made by methods disclosed in U.S. patent application Ser. No. 11/377,976 "Integration of Touch Sensors with Directly Mounted Electronic Components," which was earlier incorporated herein by reference, or by any other appropriate methods, for example, silver based thermally cured conductive ink.

Electrical connections in a matrix sensor 600 can also be made by providing vias through layers of the matrix sensor to provide access to conductors 605 or electrodes 608. With a portion of electrodes 608 or conductors 605 exposed, an electrical connection can be made by filling the vias with a conductive material such as solder, conductive paste, a connector, or coupling member, whereby the conductors 605 or electrodes 608 are coupled with an electrical connection to a connecting member. Electrodes 608 or conductors 605 can be electrically coupled to another electronic component or device or to a controller that is used to determine location of a finger touch.

Figure 7A:
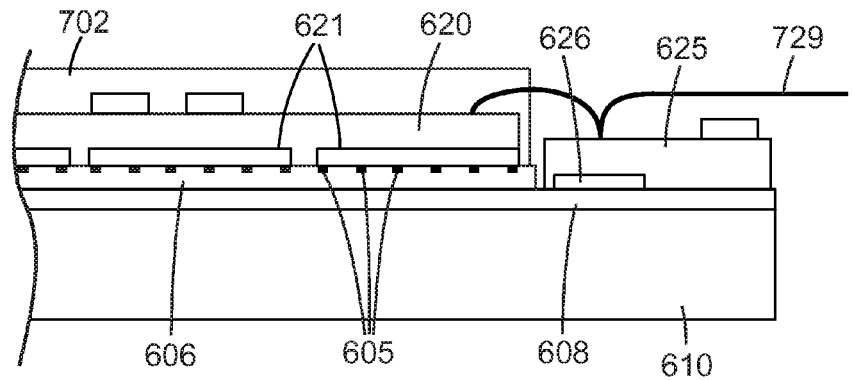
FIG. 7a shows a cross sectional view of an exemplary matrix sensor with composite electrodes.

FIG. 7a shows a cross sectional, non-exploded view of the portion of sensor 600 labeled "7a". Lower substrate 610 can be laminated to top substrate 602 with adhesive (not shown) or attached by any other appropriate method. Electrical connection 729 connects various components of the sensor to a host processor (not shown).

Figure 7B:
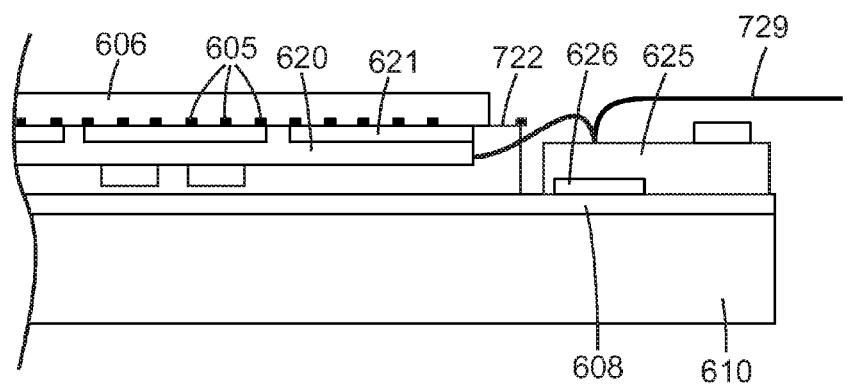

FIG. 7b shows an alternative construction of sensor 600 as compared with that shown in FIG. 7a. Particularly, upper substrate is removed and lower substrate 720 is inverted so its top surface becomes the touch surface. Dielectric spacer 722, which can be a sheet of pressure sensitive adhesive, (PSA) is laminated between substrates 606 and 610.

Touch Sensor Cross Section Simulations

Figure 8A:
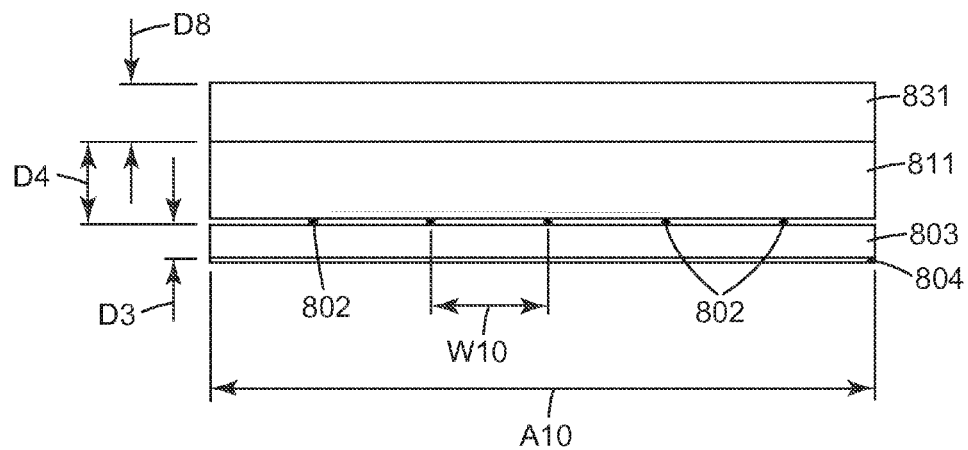
FIG. 8a shows a cross section of a touch sensor with composite upper electrodes.
Figure 8B:
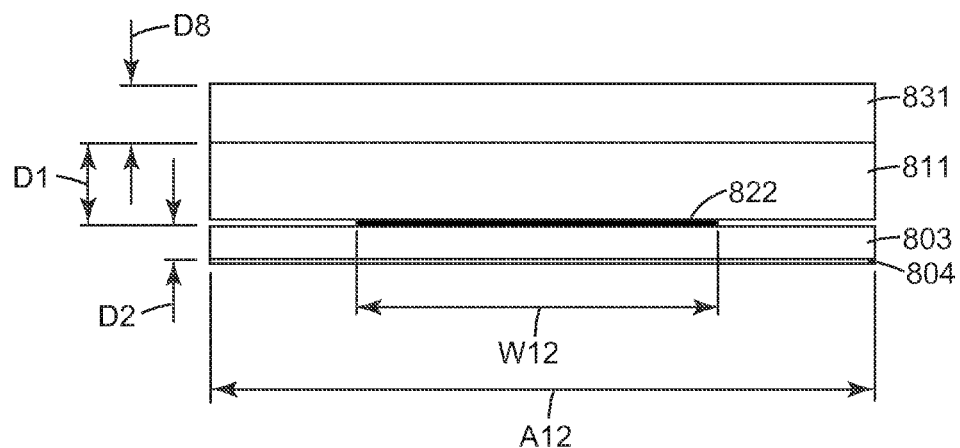
FIG. 8b shows a cross section of a touch sensor with a solid upper electrode.

Changes in capacitance to ground in cross sections of exemplary touch sensors were simulated using simulator software marketed under the trade name "Maxwell Software," version 3.1.04 from Ansoft Corp. of Pittsburgh, Pa. FIGS. 8a and 8b show cross sections of a two touch sensor designs simulated using the software. FIG. 8a includes pervious, composite upper electrodes consistent with the present disclosure and FIG. 8b shows a cross section of a touch sensor with traditional solid upper electrodes. In both FIGS. 8a and 8b, finger 831 (finger 831 is simulated as a layer of saline solution in this example) is in contact with upper substrate 811, and capacitively coupling to lower electrode 804. In FIG. 8a, a cross section of a composite conductor is shown, having conductors 802 uniformly spaced apart. FIG. 8b, a cross section of a solid electrode 822 is shown.

For all tests relating to sensors corresponding to FIGS. 8a and 8b, the following parameters were used, unless otherwise noted:

| Parameter | Value |
| --- | --- |
| Simulated PMMA relative permittivity | 3.4 |
| Simulated glass relative permittivity | 5.5 |
| Finger 831 | A saline layer extending over the entire cross section 40 microns thick. |
| Dimension A10 | 1.10 millimeters |
| Dimension W10 (equal to center spacing) | 200 microns |
| Dimension W12 (centered in the sensor section) | 550 microns × 2 microns thick |
| Dimensions of conductors 802 | 4 microns wide × 2 microns thick |
| Material of conductors in top electrodes 802 & 822 | Copper |
| Material of lower electrode section 804 | Copper |
| Material of lower substrate section 803 | PMMA |
| Thickness of lower substrate 803 | 50 microns |
| Signal on lower electrode 804 | 1 Volt |
| Signal on top electrodes 802 & 822 | 0 Volt |
| Signal on finger 831 | 0 Volt |

Capacitance-to-Ground Measurement

Figure 9A:
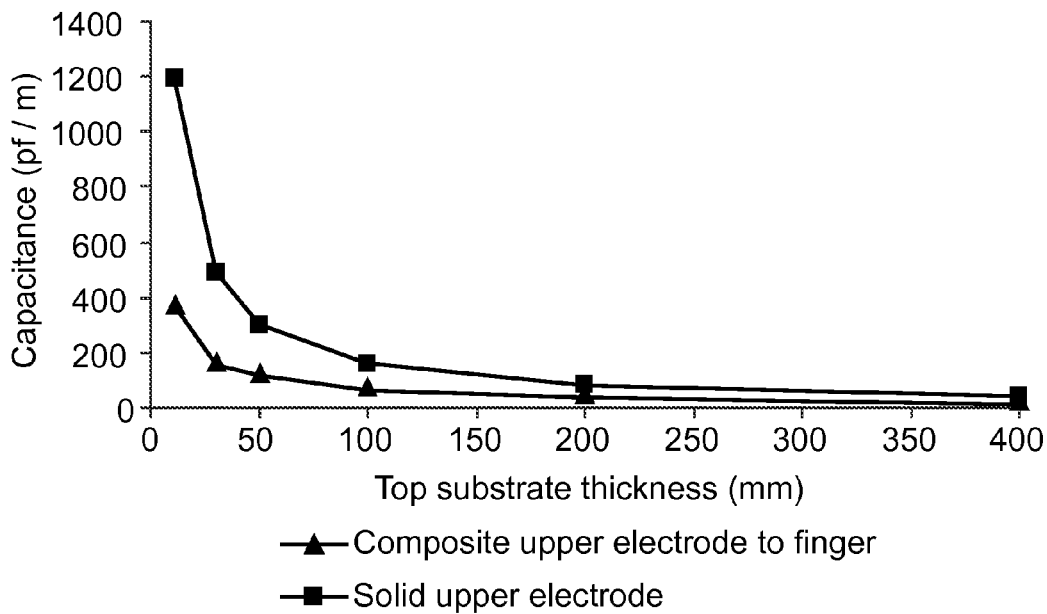
FIG. 9a is a graph that compares the capacitive coupling of a composite top electrode to a finger to the capacitive coupling of a solid top electrode to a finger.
Figure 9B:
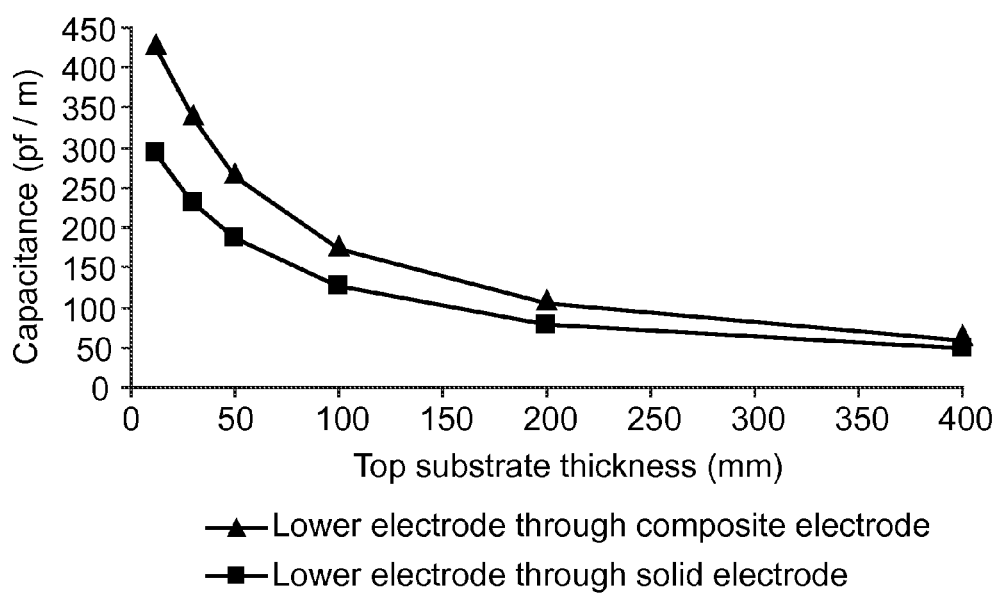
FIG. 9b is a graph that compares capacitive coupling from a lower electrode to a finger using capacitance-to-ground measurements when the top electrode is composite (i.e., pervious to an electrical field) to when the top electrode is solid.

FIGS. 9a and 9b show simulated electric field coupling (capacitance) between the upper and lower electrodes respectively, and finger 831. The x-axis shows thickness of upper substrate 811 in microns. The thickness range includes 50 to 400 microns, which are common thicknesses for rolled PET, and 0.4 mm which may simulate a PMMA rigid substrate. FIG. 9a has a simulated 1V signal on the upper electrode, with the lower electrode at ground (0 volts). FIG. 9b has a simulated 1V signal on the lower electrode, with the upper electrode at ground.

As mentioned, upper electrode 822 in FIG. 8b is 550 microns wide, with the electrode covering half of the simulated area, the dimension chosen partly for ease of simulation. However, a 50% coverage ratio is typical of current ITO electrodes used for measuring capacitance to ground. Upper electrodes for mutual capacitance touch systems may cover as little as 1%, 2%, 5%, 10% or 20% of sensor area, with typical upper ITO composite electrode widths in the range of 1 mm to 4 mm.

FIG. 9a shows that capacitive coupling of upper electrodes 802 to finger 831 is less than coupling of wide electrode 822 to finger 831 and that capacitance for both decreases as substrate thickness increases. When using mutual capacitance methods, lower parasitic capacitance usually results in higher percentage change in capacitance due to touch.

FIG. 9b compares capacitive coupling from the lower electrode 804 to finger 831 when the upper electrode is composite (FIG. 8a) and when it is solid (FIG. 8b). Upper electrodes 802 and 822 are at 0 Volts during this simulation, so the upper electrode shields some of the E-field that would couple from lower electrodes 804 to finger 831. Pervious upper electrodes provide less shielding of the E-field between lower electrodes 804 and finger 831 when compared to solid electrode 822, thus improving coupling from lower electrode 804 to finger 831.

Figure 9C:
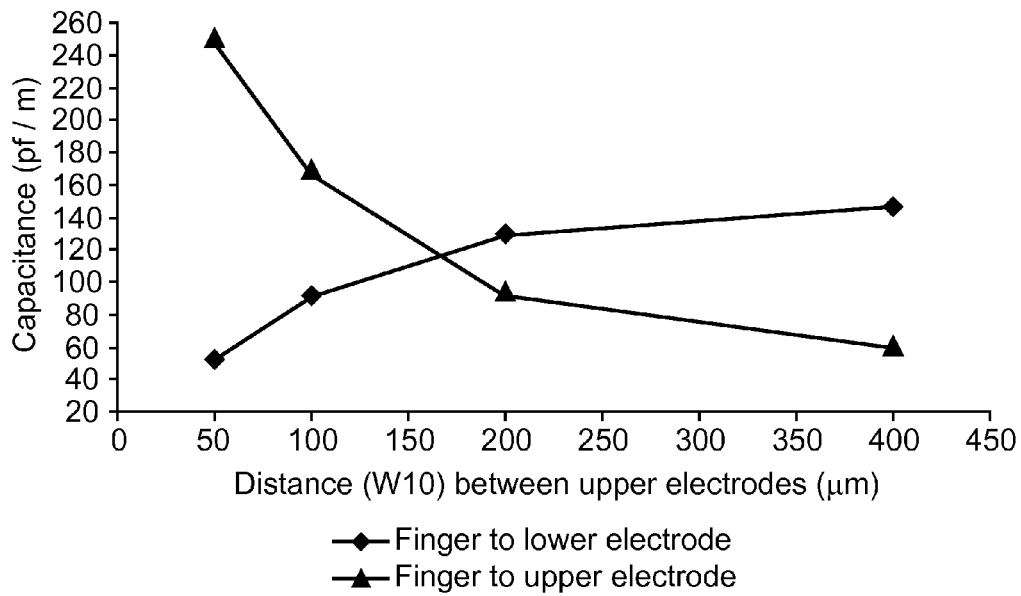
FIG. 9c is a graph that shows the relationship between inter-conductor spacing (in the top electrode) and coupling from a finger to the top and lower electrodes.

FIG. 9c shows the relationship between inter-conductor spacing (in the upper electrode) and coupling from the upper and lower electrode 104. The model is based on the sensor shown in FIG. 8a, with D3=D4=100 microns and A10=1100 microns. W10 is changed as the number of upper electrode conductors is varied. FIG. 9c shows that for this example, capacitive coupling to a touching implement to upper electrodes is equal to coupling to the lower electrode when upper electrode conductors that comprise the composite conductor are spaced equally, about 170 microns apart, for the conductors used in this simulation. Generally, spacing between conductors that comprise composite electrodes can be less than 2 times the distance from the electrode to the touch surface. Optimal conductor spacing will also vary depending on the dielectric constant of the sensor substrates.

Mutual Capacitance Measurement

Figure 9D:
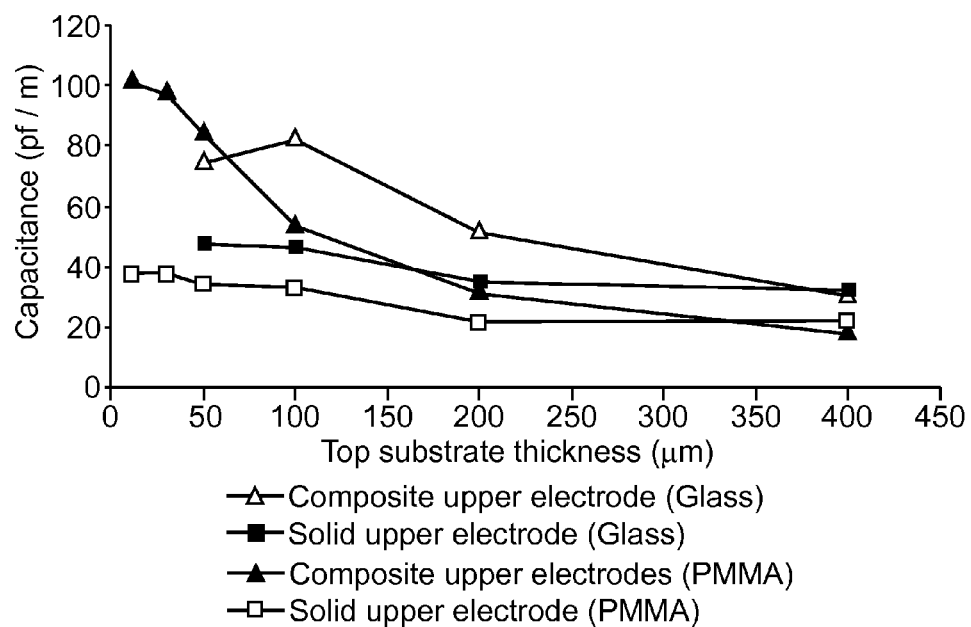
FIG. 9d is a graph that shows changes in mutual capacitance between the top and lower electrodes for glass and poly(methyl methacrylate) (PMMA) top substrates as top substrate thickness increases.

FIG. 9d shows the results of simulated E-field coupling (mutual capacitance) between the upper and lower electrodes in simulated sensors corresponding to those shown with respect to FIGS. 8a and 8b. Upper substrates 811 are simulated with PMMA and with glass. Glass is sometimes preferred because of its durability, and also the permittivity of glass is generally higher than that of PMMA. Glass in the range of 50-100 microns is available from Schott Glass Company of Mainz, Germany, (for example, Schott AF45 zero alkali thin glass and Schott 0211 thin glass). FIG. 9d shows the change in mutual capacitance between upper and lower electrode conductors due to presence of finger 831. Mutual capacitance is reduced when finger 831 is present, due to diversion of a portion of E-Field to the finger, away from upper electrode conductors. Given the 200 micron spacing between micro-conductors of the upper electrode, and the range of touch surface distances tested, mutual capacitance change during touch of electrodes made from conductors is appreciably higher than solid electrodes (greater negative slope).

FIG. 9d also shows that upper electrodes made of conductors can improve mutual capacitance touch measurement more when the top substrate is thinner. Mutual capacitance relates to the separation between conductors and to the permittivity of the top substrate material. With thin top substrates, more conductors (with less space between) will perform best, but wider separation between conductors will result in improved performance (in terms of percent change due to a touch) with thicker top substrates. The simulated 200 micron top substrate thickness gave best results with dimension D4 (FIGS. 8a and 8b) less than 200 microns, and gives good performance with D4 up to about 300 microns. The thickness D4 between upper electrodes and a touch surface can be less than twice as great as spacing between conductors in a upper electrode.

In addition, the base level of mutual capacitance between upper and lower electrodes of sensor of FIG. 8a in the no-touch state is 200 pf when substrate 811 is made of PMMA, or 240 pf when substrate 811 is made of glass. This is significantly lower than the sensor of FIG. 8b, which has inter-electrode capacitance of about 350 pf when substrate 811 is made of PMMA, or 370 pf when it is made of glass.

Figure 9E:
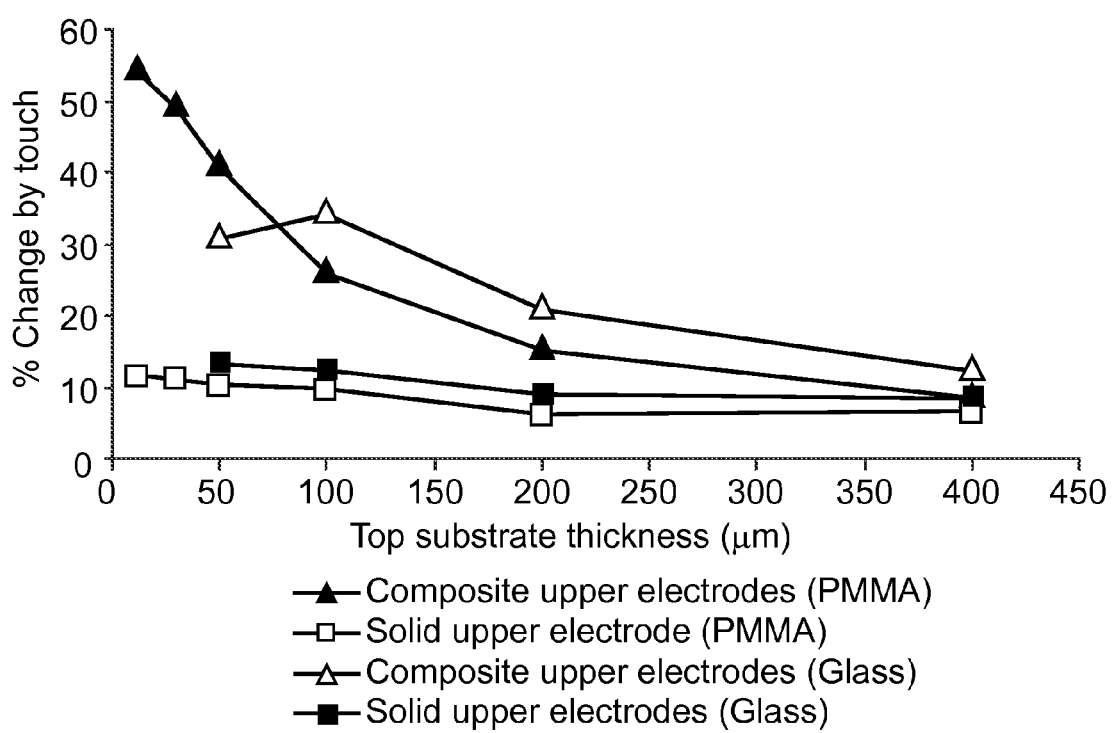
FIG. 9e is a graph that shows percent change in mutual capacitance between the top and lower electrodes for glass and PMMA top substrates as top substrate thickness increases.

FIG. 9e shows percent change in capacitance between upper and lower electrodes of sensors of FIGS. 8a and 8b with versus without a touch. The combination of higher capacitance change with lower base level (parasitic) capacitance yields significantly higher signal change with touch with composite electrodes comprised of many micro-conductors.

Two-Dimensional Touch Sensor Simulations

Figure 10A:
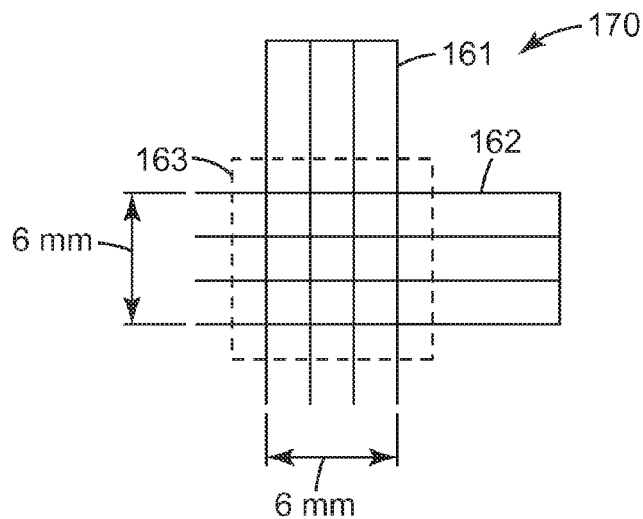
FIG. 10a shows a two-dimensional electrode arrangement with two composite electrodes oriented orthogonally to each other.
Figure 10B:
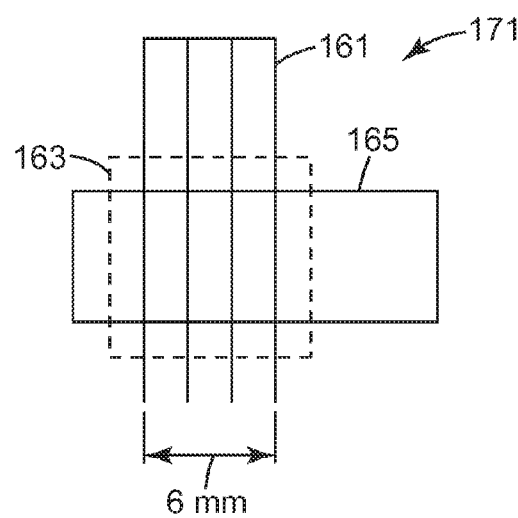
FIG. 10b shows a two-dimensional electrode arrangement with a composite upper electrode oriented orthogonally to a solid bottom electrode.
Figure 10C:
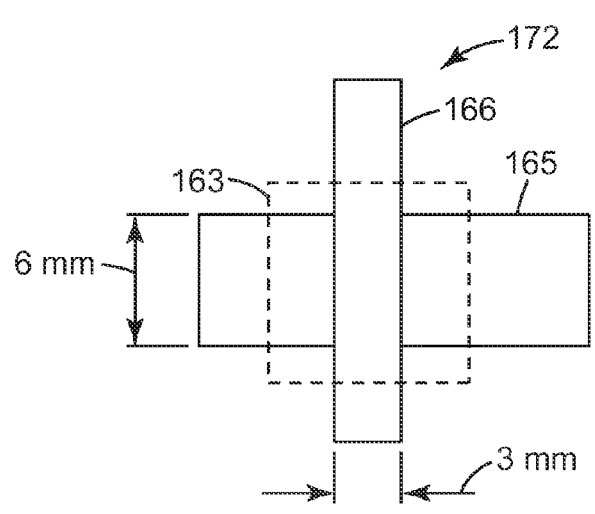
FIG. 10c shows a two-dimensional electrode arrangement with a solid upper electrode oriented orthogonally to a bottom solid electrode.

FIGS. 10a, 10b and 10c show schematics of sensors used for mutual capacitance simulations of two-dimensional electrode models (rather than the cross sectional models of FIGS. 9a-e). The same simulation software was used. FIGS. 10a, 10b and 10c show electrode arrangements 170, 171, and 172 respectively, each including two electrodes (and in the cases of sensor arrangement 170 and 171, at least one composite electrode) arranged orthogonally to one another with the upper electrode oriented vertically and the lower electrode horizontally. Composite electrodes 161 and 162 are each comprised of four equally spaced parallel conductive wires of 0.18 mm diameter, with a total composite electrode width of 6 mm. Electrodes 165 and 166 are conductive sheets 0.18 mm thick. Conductive wires, conductive sheets, and touching implement are approximated as ideal conductors for ease of simulation. When present, a touching implement touches the top dielectric (overlay) layer in the area indicated by dashed square 163.

A cross sectional view of sensors 170 and 171 would be similar to that shown with respect to FIGS. 8a and 8b, respectively, with a lower electrode 162 or 165 on the bottom, a dielectric of 0.23 mm thick PET (approximate relative permittivity=3) between the upper and lower electrodes, and a top dielectric overlay layer made of 0.23 mm thick PET (relative permittivity=3) above upper electrode 161. In some simulations an additional glass dielectric (relative permittivity=6, thickness=1 mm or 2 mm) was added to the dielectric overlay.

A cross sectional view of FIG. 10c is similar to that shown on FIG. 8b, with a lower electrode 165 on the bottom, a dielectric between the upper and lower electrodes of 0.23 mm thick PET (relative permittivity=3), and a dielectric overlay comprising 0.23 mm thick PET (relative permittivity=3) above upper electrode 166. In some simulations an additional glass dielectric (relative permittivity=6, thickness=1 mm or 2 mm) was added to the dielectric overlay.

Figure 11A:
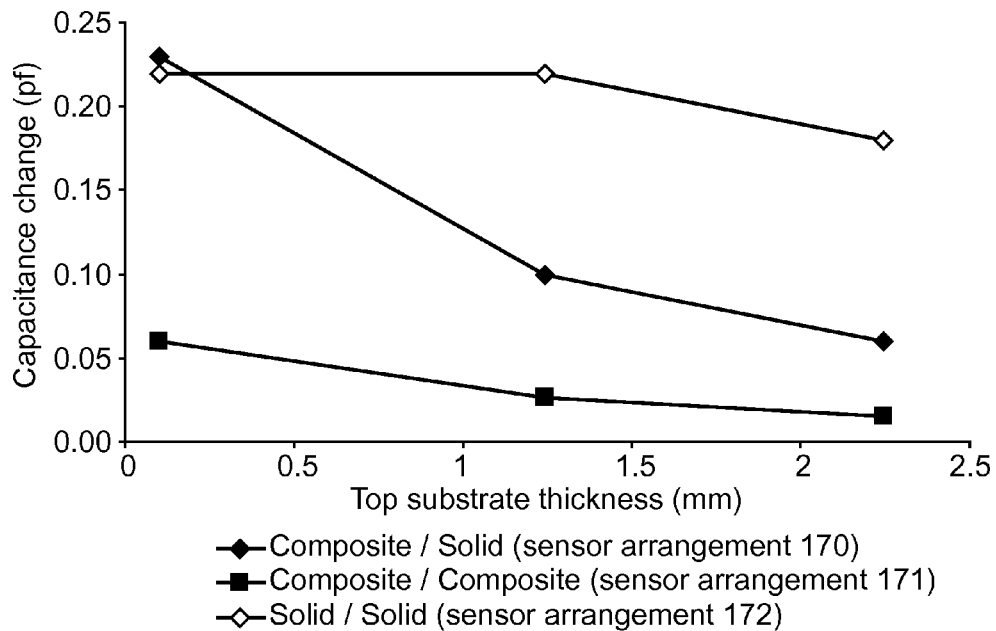
FIG. 11a is a graph that shows change in mutual capacitance due to touch as top substrate thickness varies.

FIG. 11a is a graph showing three curves. Data points on each curve indicate the difference in mutual capacitance ($\Delta$Cm) between electrodes with a touching implement in contact with the dielectric overlay versus without the touching implement. Curves connect data points corresponding to variations in $\Delta$Cm due to different thicknesses of the overlay. Simulated thicknesses of the top dielectric are:

0.23 mm of PET;
0.23 mm of PET plus 1 mm of glass; and
0.23 mm of PET plus 2 mm of glass.

The curves shown with respect to FIG. 11a indicate that mutual capacitance change due to a touch is highest for sensor configuration 172 (FIG. 10c—solid upper and lower electrodes) with thick dielectric overlays. Sensor configuration 171 (FIG. 10b) with pervious upper electrodes over solid electrodes has more mutual capacitance change when the overlay thickness is relatively thin, (less than 0.25 mm), which is consistent with the data for thinner overlays shown in FIG. 9e. Sensor configuration 170 (FIG. 10a—pervious upper and lower electrodes) has the lowest mutual capacitance change due to a touch.

Figure 11B:
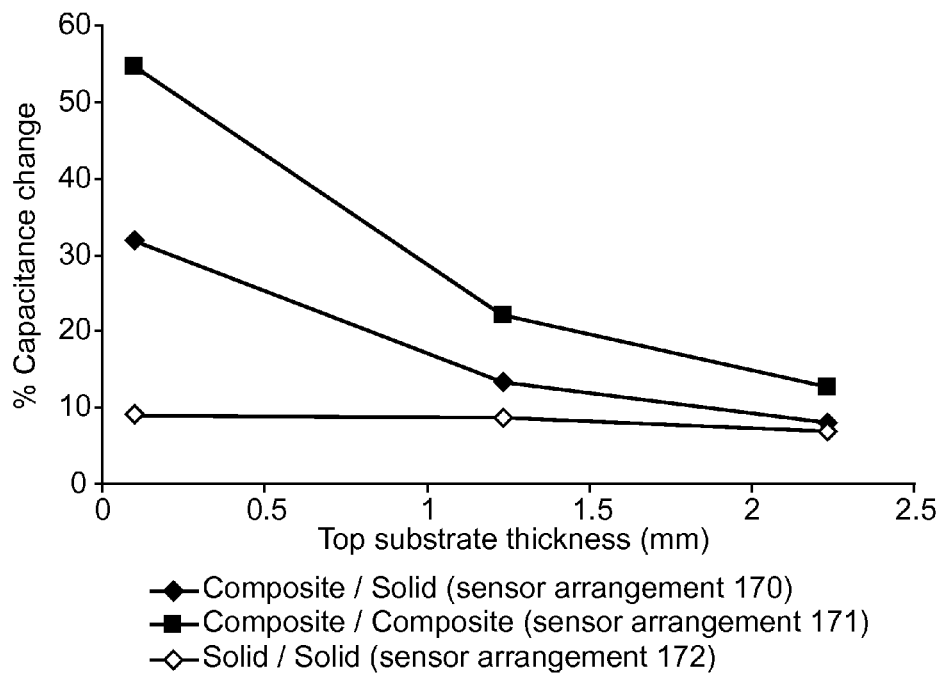
FIG. 11b is a graph that shows the percent change in mutual capacitance due to touch as top substrate thickness varies.

FIG. 11b is a graph showing sensor configuration 170 (FIG. 10a) has the highest percentage change in mutual capacitance, due to very low (approximately 0.12 pf) static levels of parasitic mutual capacitance between the two electrodes. Sensor configuration 172 (FIG. 10c) has the lowest percent change, due to the large parasitic mutual capacitance (approximately 2.5 pf) caused by the two capacitor plates in close proximity at the intersection of electrodes 165 and 166. Composite electrodes of sensor configuration 171 (FIG. 10b) minimize parasitic capacitance to approximately 0.75 pf resulting in an 8% to 32% change in mutual capacitance due to a touch, depending on overlay thickness.

Proximity of detection (distance at which a finger will reduce inter-electrode mutual capacitance) is proportional to the separation of conductors within a composite electrode (as discussed with respect to distance D4, FIG. 8a). This can be used to advantage, to help ensure that a touch is not detected until a finger is very close, or in contact with a touch surface.

This patent application refers to detection and location of a finger in proximity with a touch sensor. The invention is not limited to finger detection. An implement made of almost any electrically conductive material can be detected using the devices and methods disclosed herein. Finger(s) or conductive object(s) used in a touch are connected to ground by a capacitance and/or resistance (typically hundreds to thousands of picofarads) unless otherwise stated.

I claim:

1. A multi-layer touch panel, comprising:
a first layer comprising a transparent touch surface;
an upper electrode array and a lower electrode array defining an electrode matrix having nodes where the upper and lower electrodes cross over, and wherein the upper electrode array is disposed between the first layer and the lower electrode layer, wherein electrodes of the upper and lower electrode arrays comprise a plurality of composite electrodes comprised of a plurality of metal or metal alloy micro-wire conductors having a cross-sectional dimension of less than 10 microns;
a dielectric disposed between the upper electrode array and the lower electrode array;
wherein electrodes of the upper electrode layer are configured to be more pervious to an electric field than electrodes in the lower electrode layer.

2. The multi-layer touch panel of claim 1, wherein configured to be pervious comprises allowing an electric field to pass through spaces in the electrode.

3. The multi-layer touch panel of claim 1, wherein electrodes of the lower electrode layer are substantially isotropic.

4. The multi-layer touch panel of claim 1, wherein the micro-wires have a maximum cross-sectional dimension of less than 9 microns.

5. The multi-layer touch panel of claim 4, wherein the number of micro-wire conductors that comprise at least one of the electrodes of the first electrode layer is between the range of 2 and 10, inclusive.

6. The multi-layer touch panel of claim 1, wherein the micro-wires have a maximum cross-sectional dimension of less than 3 microns.

7. The multi-layer touch panel of claim 1, wherein the micro-wires have a maximum cross-sectional dimension of less than 5 microns.

8. The multi-layer touch panel of claim 1, wherein the micro-wires have a maximum cross-sectional dimension of between 1 and 4 microns.

9. The multi-layer touch panel of claim 1, wherein the micro-wires of the first electrode layer cover two percent or less of the surface area of the upper electrode layer.

10. The multi-layer touch panel of claim 1, wherein the center-to-center spacing of the micro-wire conductors that comprise at least one of the electrodes of the lower electrode array is less than the center-to-center spacing of the micro-wire conductors that comprise at least one of the electrodes of the upper electrode array.

11. The multi-layer touch panel of claim 10, wherein the center-to-center spacing of the micro-wire conductors that comprise the at least one electrode of the lower electrode array is at least four times less than the center-to-center spacing of the micro-wire conductors that comprise the at least one electrode of the upper electrode array.

12. The multi-layer touch panel of claim 1, wherein the micro-wire conductors that comprise the electrodes of the first electrode layer are substantially uniformly spaced on the upper electrode layer.

13. The multi-layer touch panel of claim 1, wherein the center-to-center spacing of the micro-wire conductors that comprise at least one of the electrodes of the first electrode layer is less than 4 mm.

14. The multi-layer touch panel of claim 13, wherein the micro-wire conductors that comprise at least one electrode of the first electrode layer electrode include conductor bridges.

15. The multi-layer touch panel of claim 1, further comprising:
a drive circuit configured to electrically drive at least one of the lower electrodes; and,
a receive circuit configured to sense signals indicative of capacitance between an electrode in the upper electrode layer and an electrode in the lower electrode layer.

16. The multi-layer touch panel of claim 1, further comprising:
a drive circuit configured to electrically drive at least one of the lower electrodes; and,
a measurement circuit configured to sense signals indicative of capacitance between an electrode in the lower electrode layer and a ground reference voltage.

17. The multi-layer touch panel of claim 1, further comprising:
a drive circuit configured to electrically drive at least one electrode in upper electrode layer; and,
a receive circuit configured to sense signals indicative of capacitance between the at least one electrode in the lower electrode layer and a ground reference voltage.

18. A method for identifying locations of touches or near-touches on a touch sensitive apparatus, comprising:
sensing, with an electronic controller, a value indicative of the change of mutual capacitance between an overlapping first electrode and a second electrode disposed in a matrix-type touch sensor, the change in mutual capacitance induced by the presence of an object proximate to the touch sensor, wherein the first and second electrodes are metal or metal alloy electrodes comprised of a plurality of micro-wire conductors having an average cross-sectional dimension of less than 10 microns; wherein the electrode positioned closer to the touches or near-touches defines an upper electrode, and the other electrode defines a lower electrode, and wherein the upper electrode is more pervious to an electric field than the lower electrode.

19. The method of claim 18, wherein the more pervious comprises a greater tendency to allow coupling of an electric field from a lower electrode through spaces in the upper electrode layer.

20. The method of claim 18, wherein the micro-wire conductors have a maximum cross-sectional dimension of less than 5 microns.

21. The method of claim 18, wherein the center-to-center spacing of the micro-wire conductors that comprise the first electrode is less than 4 mm.

22. The method of claim 18, wherein the number of micro-wire conductors that comprise the composite conductor is between 2 and 10.

23. The method of claim 18, wherein the lower electrode is isotropic.

* * * * *